US012415373B2

(12) United States Patent
Mizutani

(10) Patent No.: US 12,415,373 B2
(45) Date of Patent: Sep. 16, 2025

(54) CUTTING DEVICE AND PRINTER

(71) Applicant: BROTHER KOGYO KABUSHIKI KAISHA, Nagoya (JP)

(72) Inventor: Hiromitsu Mizutani, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 1145 days.

(21) Appl. No.: 17/206,571

(22) Filed: Mar. 19, 2021

(65) Prior Publication Data

US 2021/0339544 A1 Nov. 4, 2021

(30) Foreign Application Priority Data

Apr. 30, 2020 (JP) ................................ 2020-080032

(51) Int. Cl.
*B41J 11/70* (2006.01)
*B41J 3/407* (2006.01)

(52) U.S. Cl.
CPC ........... *B41J 11/703* (2013.01); *B41J 3/4075* (2013.01)

(58) Field of Classification Search
CPC ......... B41J 11/703; B41J 11/666; B41J 11/66; B41J 11/663; B41J 3/4075; B26D 1/305; B26D 1/08; B26D 1/085; B26D 2001/0053; B26D 2001/006; B26D 1/30
USPC .......... 347/104; 83/694, 626, 515, 585, 607, 83/589
See application file for complete search history.

(56) References Cited

U.S. PATENT DOCUMENTS

| | | | | |
|---|---|---|---|---|
| 363,524 A * | 5/1887 | Libbey | B23D 17/08 | 83/605 |
| 4,122,740 A * | 10/1978 | Maltby | B23D 15/08 | 83/646 |
| 4,951,540 A * | 8/1990 | Cross | E04D 15/02 | 83/695 |

(Continued)

FOREIGN PATENT DOCUMENTS

| | | | |
|---|---|---|---|
| DE | 29622352 U1 * | 4/1997 | B26B 9/02 |
| JP | 2009-39807 A | 2/2009 | |

(Continued)

OTHER PUBLICATIONS

Japanese Office Action for the related Japanese Patent Application No. 2020-080032 dated Nov. 14, 2023.

*Primary Examiner* — Laura M Lee
(74) *Attorney, Agent, or Firm* — KENEALY VAIDYA LLP

(57) ABSTRACT

A cutting device includes a support base, a cutting blade, and a holding member. The cutting blade has first and second holes and a blade edge. The blade edge has a first convex portion and a second convex portion, provided at a position corresponding to the first and second holes, respectively. In a case where the cutting blade is arranged at a cutting position, a maximum value of a distance between the blade edge and the support base within a range between the first and second holes in a longitudinal direction of the cutting blade is smaller than a maximum value of a distance between the blade edge and the support base. The cutting blade is fixed to the holding member by a first hole coupling member, and the holding member holds the cutting blade so as to be movable to the cutting position and a spaced position.

16 Claims, 10 Drawing Sheets

(56) References Cited

U.S. PATENT DOCUMENTS

| | | | | |
|---|---|---|---|---|
| 5,090,285 | A * | 2/1992 | Kondo | B26D 3/12<br>83/636 |
| 6,595,093 | B1 * | 7/2003 | Artigas | B26D 7/016<br>83/605 |
| 9,199,385 | B2 * | 12/2015 | Crookston | B26D 1/30 |
| 2015/0084262 | A1 | 3/2015 | Sago et al. | |
| 2019/0299670 | A1 | 10/2019 | Mizutani et al. | |

FOREIGN PATENT DOCUMENTS

| | | | |
|---|---|---|---|
| JP | 2015-136908 | A | 7/2015 |
| JP | 2019-171553 | A | 10/2019 |

* cited by examiner

CUTTING DEVICE AND PRINTER

CROSS-REFERENCE TO RELATED APPLICATIONS

This application is based upon and claims the benefit of priority from prior Japanese patent application No. 2020-080032, filed on Apr. 30, 2020, the entire contents of which are incorporated herein by reference.

TECHNICAL FIELD

The present disclosure relates to a cutting device and a printer.

BACKGROUND ART

In related art, a printer that can perform printing on a long tape having a plurality of stacked layers includes a cutting device capable of cutting at least a part of the printed tape. The cutting device includes a half-cut mechanism, a full-cut mechanism, and a cutter drive motor. The half-cut mechanism includes a support base, a cutting blade, and a holding member. The cutting blade can move to a cutting position at which some layers of the tape placed on the support base is cut and a spaced position spaced from the support base. The cutting blade has a first hole penetrating in a thickness direction, and is fixed to the holding member by a coupling member such as a screw inserted in the first hole. The half-cut mechanism is driven when the cutter drive motor rotates its output shaft in a predetermined direction, thereby performing a half-cut operation of cutting some layers of the tape placed on the support base. The full-cut mechanism includes a fixed blade and a movable blade, and is driven when the cutter drive motor rotates its output shaft in an opposite direction to the predetermined direction, thereby performing a full-cut operation of cutting all layers of the tape arranged between the fixed blade and the movable blade.

In the cutting device, when the first hole is formed to the cutting blade by press working, deformation occurs due to material flow of the portion in which the first hole is formed, so that a small convex portion is formed to a blade edge extending in a straight line shape. The convex portion is convex in a direction from the first hole toward the blade edge by an amount corresponding to a distance between the first hole and the blade edge. A distance between the blade edge and the support base in a case where the cutting blade is arranged at the cutting position varies in the extension direction of the blade edge.

SUMMARY

Aspects of the present disclosure provide a cutting device and a primer capable of reducing variation in distance between a blade edge and a support base in a case where a cutting blade is arranged at a cutting position as compared to related art, without increasing a size of the cutting blade as compared to related art.

According to a first aspect of the present disclosure, there is provided a cutting device including: a support base; a cutting blade configured to cut at least a part of a tape arranged between the cutting blade and the support base in a case where the cutting blade is arranged at a culling position close to the support base, the cutting blade having: a first hole penetrating in a thickness direction of the cutting blade a second hole arranged side by side with the first hole in a longitudinal direction of the cutting blade; and a blade edge extending in the longitudinal direction of the cutting blade, the blade edge having a first convex portion and a second convex portion, the first convex portion being provided at a position corresponding to the first hole in the longitudinal direction of the cutting blade and being convex in a convex direction which is a direction from the first hole toward the blade edge, and the second convex portion being provided at a position corresponding to the second hole in the longitudinal direction of the cutting blade and being convex in the convex direction, and in a case where the cutting blade is arranged at the cutting position, a maximum value of a distance between the blade edge and the support base within a range between the first hole and the second hole in the longitudinal direction of the cutting blade being smaller than a maximum value of a distance between the blade edge and the support base; and a holding member to which the cutting blade is fixed by a first hole coupling member inserted in the first hole, the holding member holding the cutting blade so as to be movable to the cutting position and a spaced position at which the cutting blade is distant from the support base.

According to a second aspect of the present disclosure, there is provided a printer including: the cutting device according to the first aspect; a printing unit configured to perform printing on the tape; and a conveying unit configured to convey the tape printed by the printing unit, wherein the cutting blade and the support base are arranged to face each other with the tape conveyed by the conveying unit being interposed therebetween.

DESCRIPTION OF EMBODIMENTS

Figure 1:
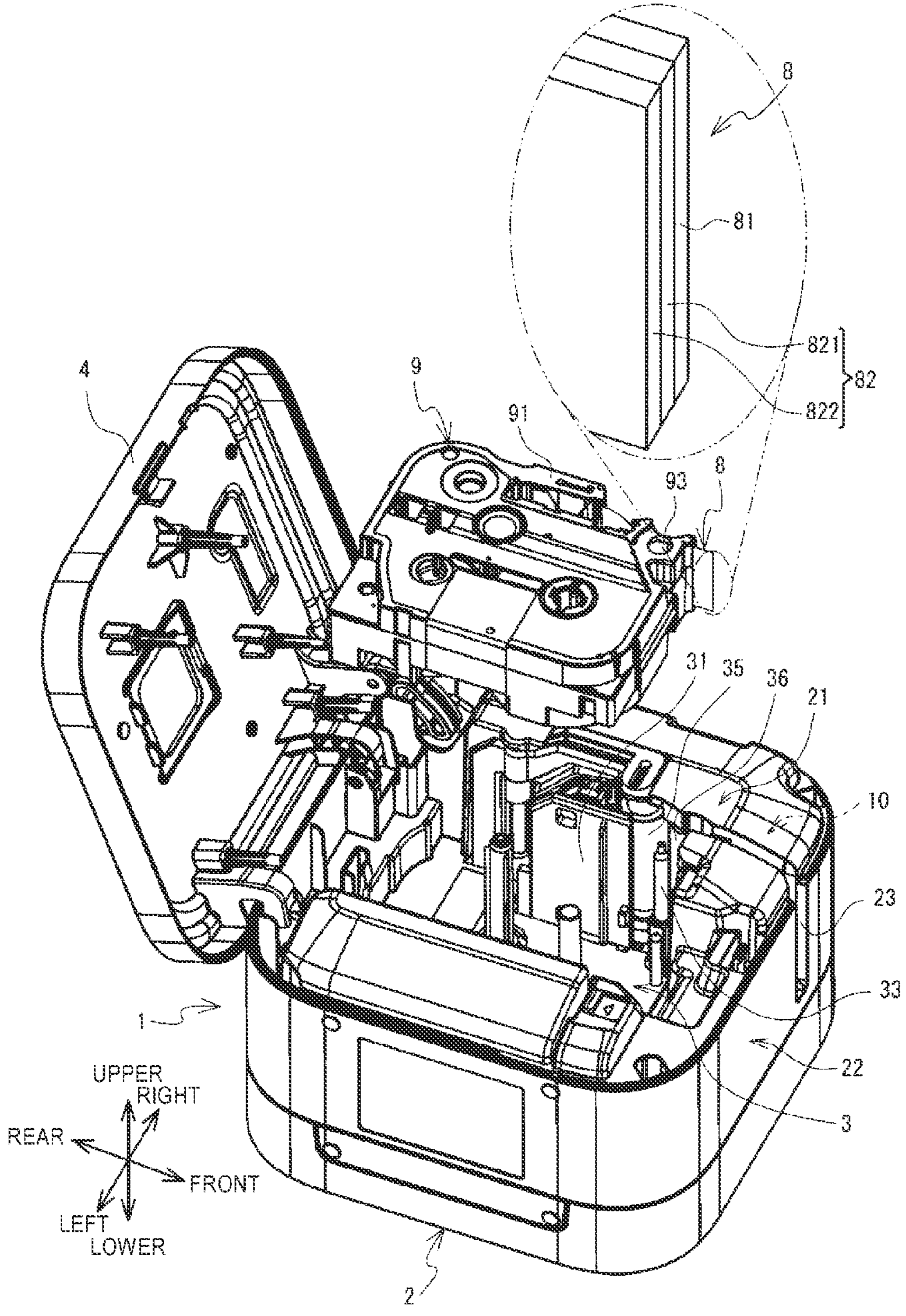
FIG. 1 is a perspective view of a printer 1.

A printer 1 in accordance with an embodiment of the present disclosure will be described with reference to the drawings. In descriptions below, the upper, lower, left, right, front and rear denoted in the drawings are used. A schematic configuration of the printer 1 is described with reference to FIGS. 1 and 2. The printer 1 is a label printer configured to prepare a tape 8 on which an image is printed, by using a tape cassette 9. The tape cassette 9 includes a cassette case 91, an ink ribbon (not shown), a printing tape 81, and a bonding tape 82. The cassette case 91 is configured to accommodate therein the ink ribbon, the printing tape 81, and the bonding tape 82. The cassette case 91 has a feeding roller 93 provided at a corner part on a right front side of the cassette case 91. A part of the feeding roller 93 is exposed rightward from the cassette case 91.

Figure 2:
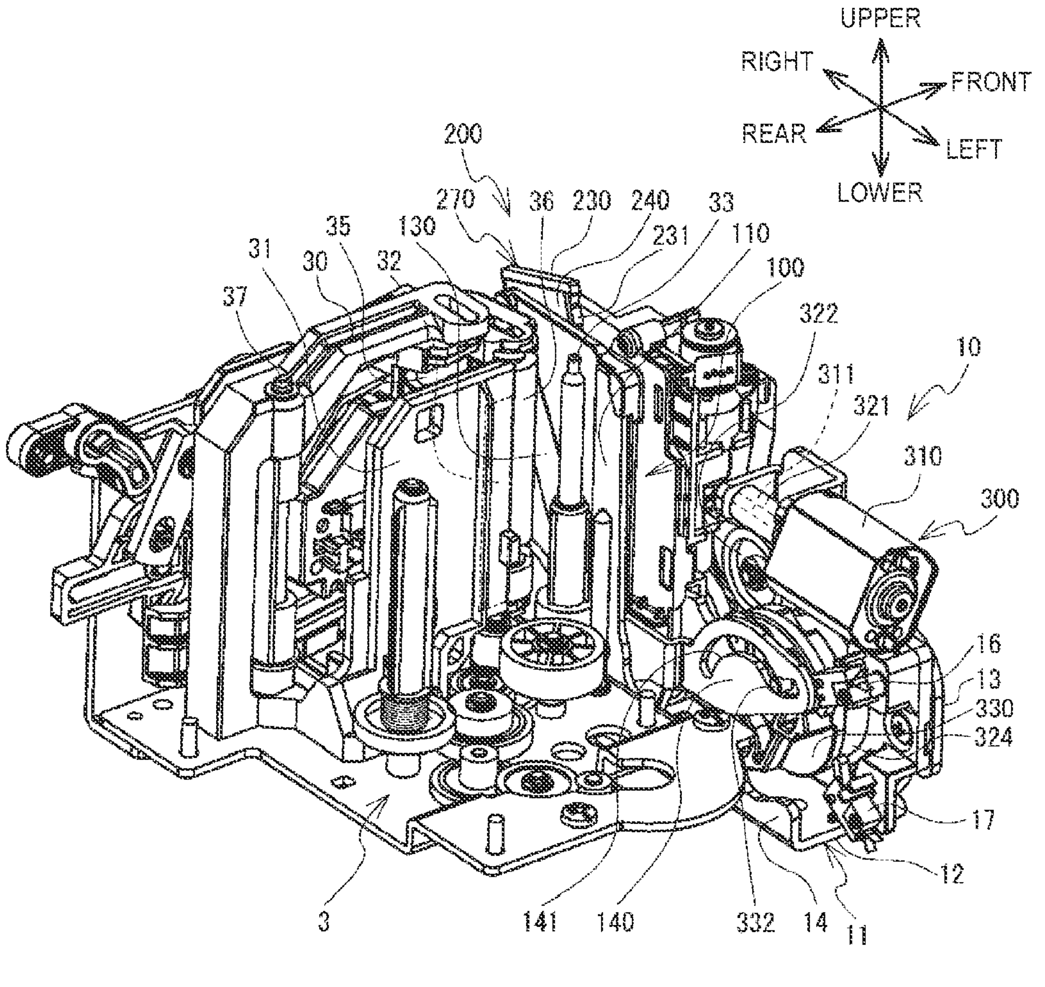
FIG. 2 is a perspective view of an internal structure of a case 2.

As shown in FIGS. 1 and 2, the printer 1 includes a case 2, a cover 4, a head holder 31, a thermal head 32, a tape feeding shaft 33, a conveying motor (not shown), a platen holder 30, a platen roller 35, a pressing roller 36, a cutting device 10, a discharge opening 23, and a controller (not shown). The cover 4 is provided on an upper side of the case 2, and can be opened and closed with respect to the case 2. The case 2 has a mounting part 3 to which the tape cassette 9 is detachably mounted. The mounting part 3 is a region recessed downward from an upper surface 21 of the case 2.

The head holder 31 extends in a plate shape at a right part of the mounting part 3, in a side view. The thermal head 32 is provided on a right surface of the head holder 31, and has a plurality of heat generating elements aligned in line in a main scanning direction (upper and lower direction) orthogonal to a conveying direction (front) of the tape 8. The tape feeding shaft 33 extends in the upper and lower direction on a front side of the thermal head 32. The tape feeding shaft 33 is rotatively driven by the conveying motor accommodated in the upper surface 21 of the case 2.

The platen holder 30 is provided on a right side of the mounting part 3. A rear end portion of the platen holder 30 is supported to be rotatable around a shaft 37 by the shaft 37 extending in the upper and lower direction. A front end portion of the platen holder 30 is configured to rotatably support each of the platen roller 35 and the pressing roller 36. The platen roller 35 is arranged on a right side of the head holder 31, and faces the thermal head 32. The pressing roller 36 is arranged on a front side of the platen roller 35, and faces the tape feeding shaft 33. As the cover 4 is opened and closed with respect to the case 2, the front end portion of the platen holder 30 swings substantially in the right and left direction about the shaft 37, so that the platen roller 35 and the pressing roller 36 move toward and away from the thermal head 32 and the tape feeding shaft 33.

The cutting device 10 is provided on a front side of the tape feeding shaft 33, and can cut at least a part of the tape 8 in a thickness direction (right and left direction) of the tape 8. The cutting device 10 will be described in detail later. The discharge opening 23 is provided in a front face 22 of the case 2 on a front side of the cutting device 10. The discharge opening 23 is an opening extending in the upper and lower direction, and the tape 8 cut by the cutting device 10 can be discharged from an inside of the case 2 to an outside of the case 2 through the discharge opening. The controller is configured to control the thermal head 32, the conveying motor, and the cutting device 10.

A method of performing printing on the tape 8 by using the printer 1 is described. A user opens the cover 4 with respect to the case 2, and mounts the tape cassette 9 into the mounting part 3 of the printer 1. The tape feeding shaft 33 is inserted into the feeding roller 93. The user closes the cover 4 with respect to the case 2. The platen roller 35 is arranged adjacent to the thermal head 32, and presses the printing tape 81 and the ink ribbon to the thermal head 32. The controller drives the thermal head 32 and the conveying motor according to print data. The thermal head 32 heats the ink ribbon according to the print data, thereby printing an image on the printing tape 81. The pressing roller 36 is arranged adjacent to the thermal head 32, and presses the printing tape 81 and the bonding tape 82 to the feeding roller 93. The tape feeding shaft 33 is rotated as the conveying motor is driven, thereby rotating the feeding roller 93. The rotation of the feeding roller 93 bonds the bonding tape 82 to the printing tape 81 between the feeding roller 93 and the pressing roller 36 to prepare the tape 8 and conveys the prepared tape 8 in the conveying direction. The controller drives the cutting device 10. The tape 8 is cut by the cutting device 10, and is then discharged to an outside of the case 2 through the discharge opening 23.

As described above, the tape 8 of the present embodiment is prepared by bonding the bonding tape 82 to the printing tape 81 having an image printed thereon. Therefore, the tape 8 is configured by a plurality of stacked layers (see the enlarged view in FIG. 1). Specifically, the printing tape 81 is a transparent PET tape. The bonding tape 82 has a configuration where a release paper 822 is releasably bonded to one surface of a both-sided adhesive tape 821. The tape 8 has a configuration where the other surface of the both-sided adhesive tape 821 is bonded to a printing surface of the printing tape 81. A direction in which the plurality of layers of the tape 8 is stacked is a thickness direction of the tape 8.

Figure 3:
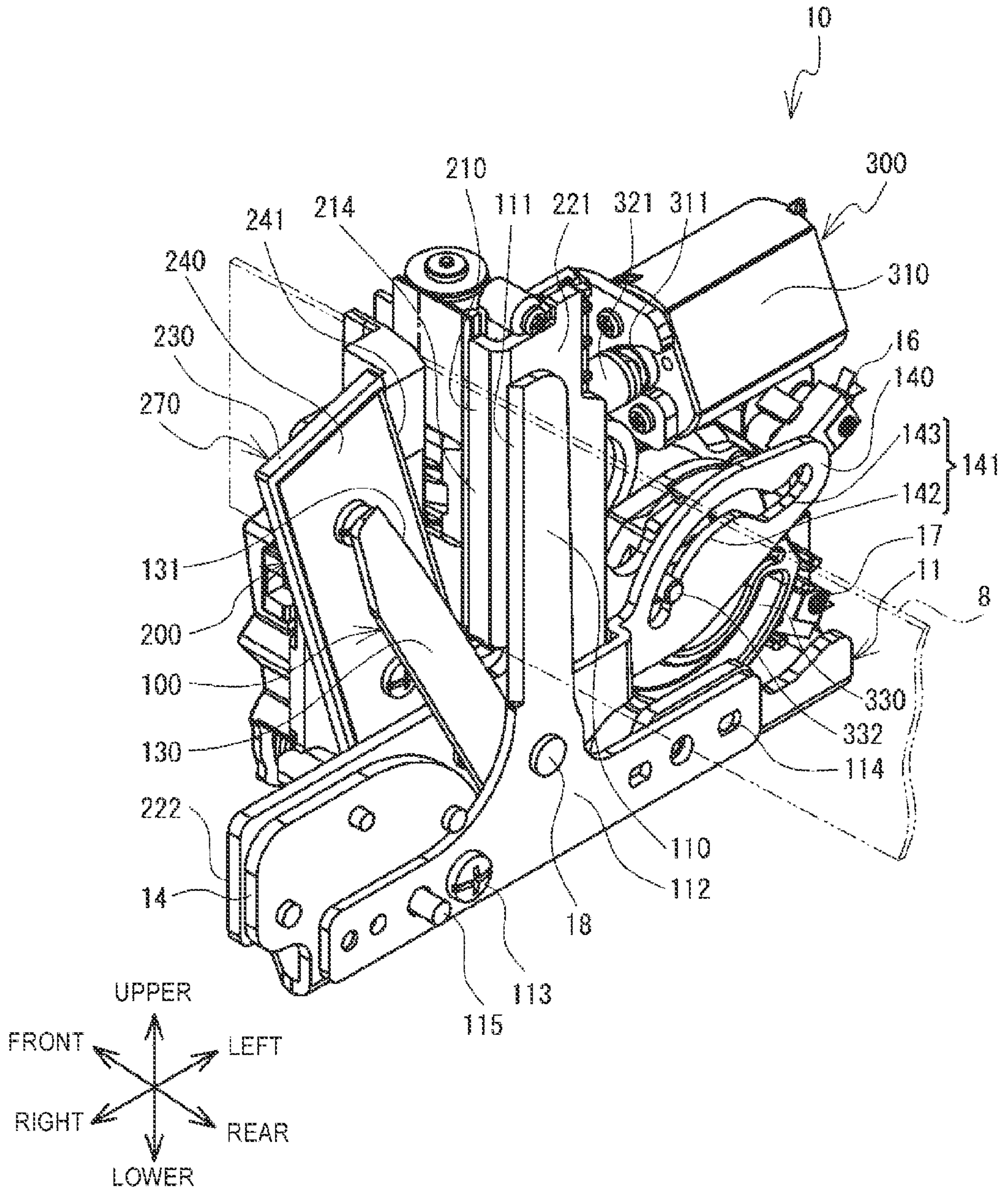
FIG. 3 is a perspective view of a cutting device 10.
Figure 4:
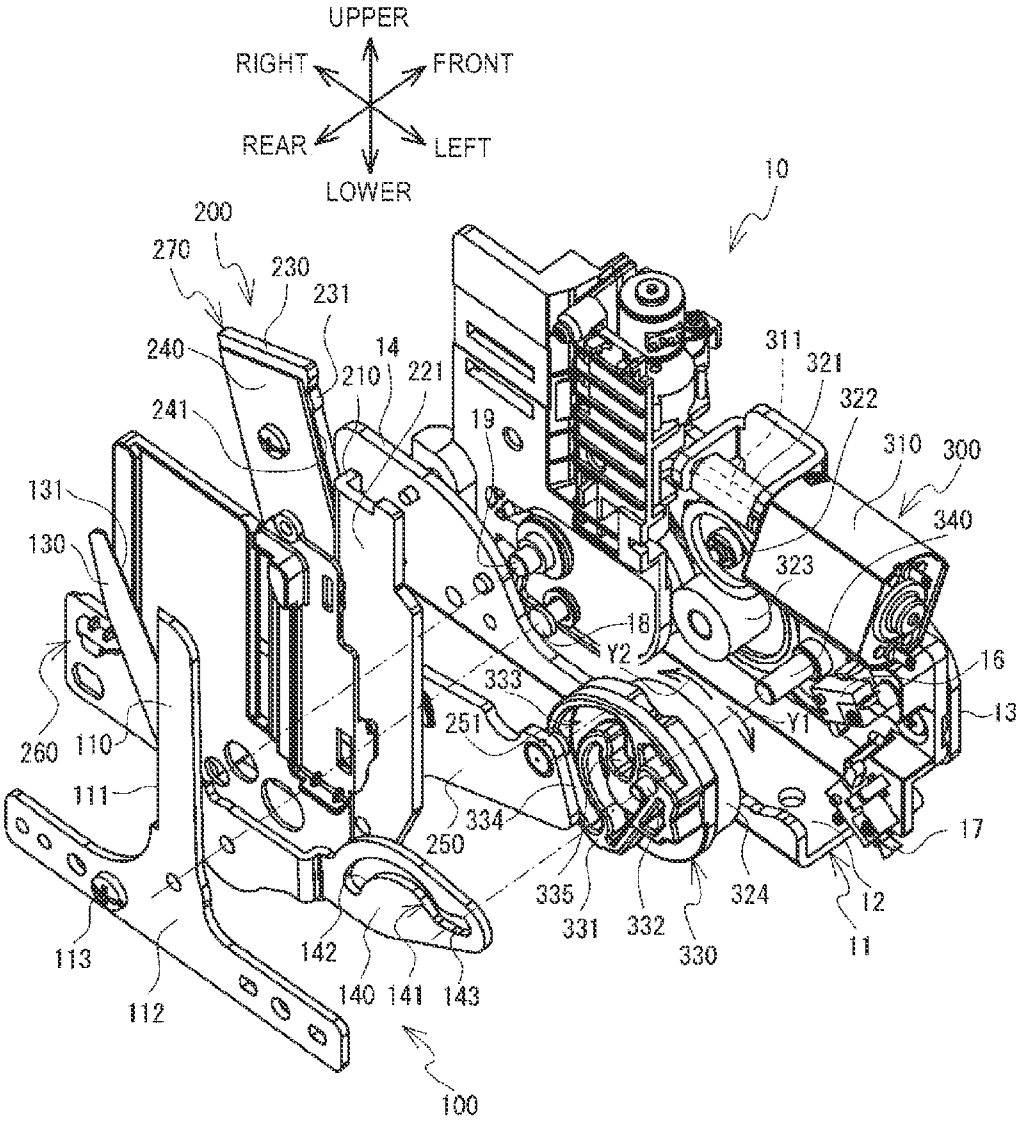
FIG. 4 is an exploded perspective view of the culling device 10.

The cutting device 10 is described in detail with reference to FIGS. 2 to 9. As shown in FIGS. 2 to 4, the cutting device 10 includes a full-cut mechanism 100, a half-cut mechanism 200, a drive mechanism 300, a fixing frame 11, and a spacer 260. In FIG. 3, the spacer 260 is not shown for convenience.

The full-cut mechanism 100 is configured to perform a full-cut operation of cutting the tape 8 entirely in the thickness direction. In the below, the "full-cut" refers to that the tape 8 is entirely cut in the thickness direction by the full-cut operation. The half-cut mechanism 200 is configured to perform a half-cut operation of cutting the tape 8 partially in the thickness direction. The half-cut mechanism 200 of the present embodiment is configured to entirely cut the printing tape 81 and the both-sided adhesive tape 821 of the tape 8 in the thickness direction and to partially cut the release paper 822 in the thickness direction. In the below, the "half-cut" refers to that the tape 8 is partially cut in the thickness direction by the half-cut operation. The drive mechanism 300 is configured to selectively drive the full-cut mechanism 100 and the half-cut mechanism 200. The full-cut mechanism 100, the half-cut mechanism 200, and the drive mechanism 300 will be described in detail later.

The fixing frame 11 fixes the full-cut mechanism 100, the half-cut mechanism 200 and the drive mechanism 300. The fixing frame 11 is fixed to the case 2 (refer to FIG. 1) on a front side of the mounting part 3. The fixing frame 11 is formed into a U-shape, in a side view, and has a lower frame 12, a front frame 13, and a rear frame 14. The front frame 13 extends upward from a front end of the lower frame 12. The rear frame 14 extends upward from a rear end of the lower frame 12. The spacer 260 is a plate-shaped member arranged between the full-cut mechanism 100 and the half-cut mechanism 200 in the front and rear direction.

The full-cut mechanism 100 is described in detail with reference to FIGS. 3 and 4. As shown in FIGS. 3 and 4, the full-cut mechanism 100 includes a fixed blade 110, a fixed part 112, a cutting blade 130, a first arm 140, and a first shaft 18. The fixed blade 110 has a rectangular plate shape extending in the upper and lower direction, in a rear view. A right end of the fixed blade 110 is a blade edge 111.

Therefore, the blade edge 111 is directed rightward. The fixed part 112 extends toward both left and right sides from a lower end of the fixed blade 110. The fixed blade 110 and the fixed part 112 are integrally formed, and have an inverted T-shape as a whole, in a rear view. The fixed part 112 is fixed to a backside of the rear frame 14 by a fixing member 113, and is positioned with respect to the rear frame 14 by the fixing member 113 and convex portions 114 and 115 extending rearward from the backside of the rear frame 14. The fixed blade 110 extends upward from a position of the fixed part 112 between the fixing member 113 and the convex portion 114 in the right and left direction.

The cutting blade 130 has a rectangular plate extending in the upper and lower direction, in a rear view, and is provided on a front side of the fixed blade 110. The cutting blade 130 faces the fixed blade 110 from the right side with the tape 8 being interposed therebetween, in a rear view. A left end of the cutting blade 130 is a blade edge 131. Therefore, the blade edge 131 is directed leftward.

The first arm 140 is coupled to the cutting blade 130. The first arm 140 extends leftward from a lower end of the cutting blade 130, is bent forward, and is further bent leftward and extends leftward. The first arm 140 of the present embodiment is integrally formed with the cutting blade 130. The first arm 140 has a first groove 141 formed at a left side part of the first arm 140. The first groove 141 is configured by an arc groove 142 and a pressing groove 143. The arc groove 142 has an arc shape whose center is a third shaft 340 (refer to FIG. 4), which will be described later, and which is convex upward, in a rear view. The pressing groove 143 extends from a left end of the arc groove 142 further away from (the upper left side, in FIG. 3) the third shaft 340, which will be described later. In the first groove 141, a first pin 332 that will be described later is fitted.

Figure 5:
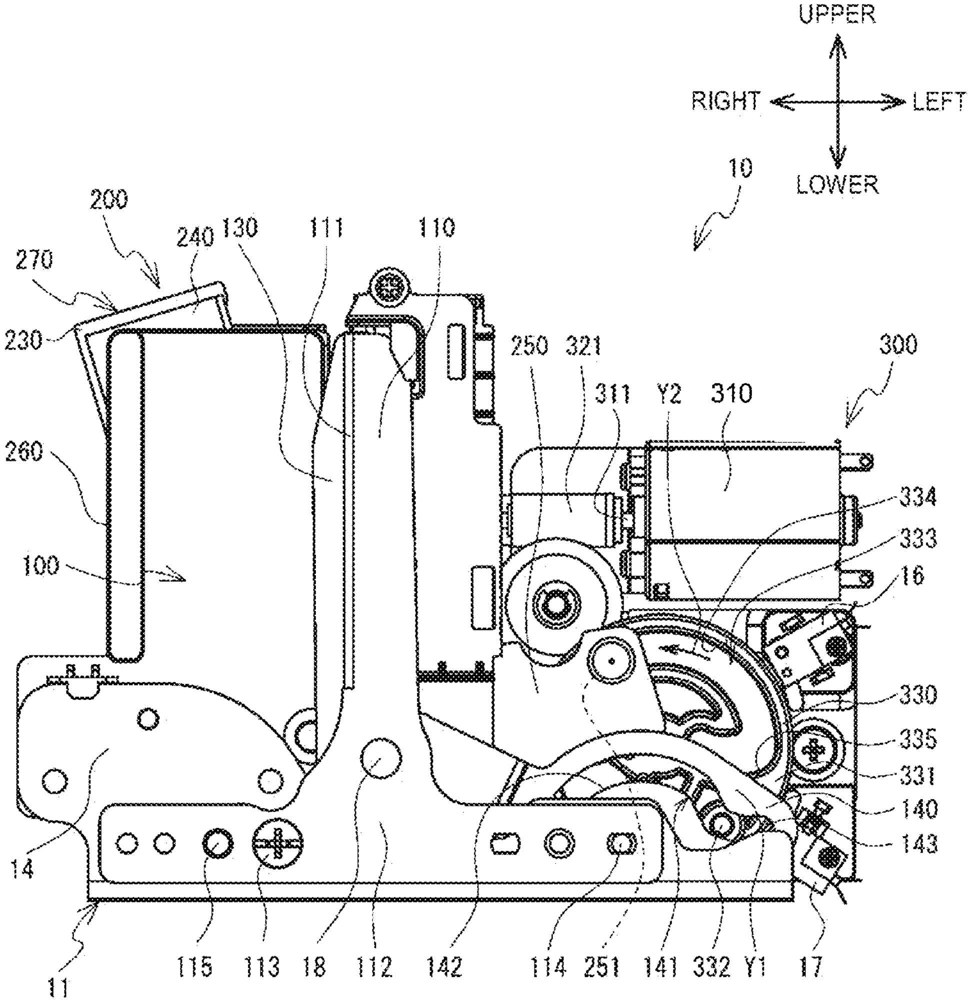
FIG. 5 is a rear view of the cutting device 10 when a cutting blade 130 is located at a full-cut position.

The first shaft 18 is configured to support the first arm 140 so as to be rotatable around the first shaft 18. The first shaft 18 extends rearward from a right lower part of a backside of the front frame 13, penetrates a fixed part 222 (refer to FIG. 3) and the spacer 260 (refer to FIG. 4) in corresponding order, penetrates a right end portion of the first arm 140 and extends to a lower end portion of the fixed blade 110. The cutting blade 130 is configured to rotate around the first shaft 18 toward or away from the fixed blade 110 according to rotation of the first arm 140. The cutting blade 130 can rotate around the first shaft 18 to move between a standby position (refer to FIG. 3) and a full-cut position (refer to FIG. 5). As shown in FIG. 3, when the culling blade 130 is located at the standby position, the cutting blade 130 is spaced rightward from the fixed blade 110. In this case, the cutting blade 130 does not overlap the fixed blade 110 in the front and rear direction. As shown in FIG. 5, when the cutting blade 130 is located at the full-cut position, the cutting blade 130 comes close to the fixed blade 110. In this case, the cutting blade 130 overlaps the fixed blade 110 in the front and rear direction.

In the full-cut operation by the full-cut mechanism 100, the cutting blade 130 moves from the standby position to the full-cut position as the first arm 140 rotates, so that the blade edge 131 of the cutting blade 130 moves to intersect with the blade edge 111 of the fixed blade 110, in a rear view. Thereby, the tape 8 is sandwiched and is full-cut (so-called, a scissors manner) between the blade edge 111 of the fixed blade 110 and the blade edge 131 of the cutting blade 130.

Figure 6:
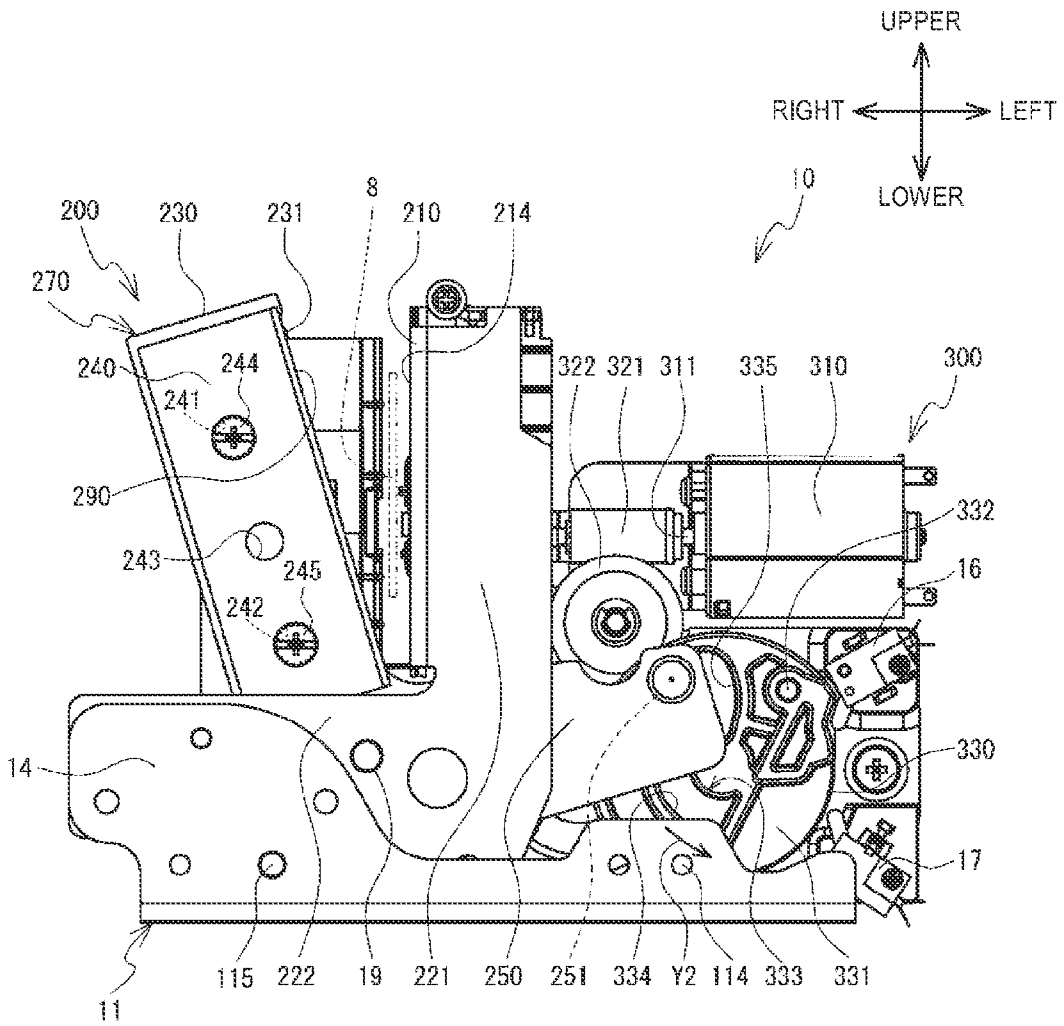
FIG. 6 is a rear view of the cutting device 10 (excluding a full-cut mechanism 100) when a cutting blade 240 is located at a spaced position.
Figure 7:
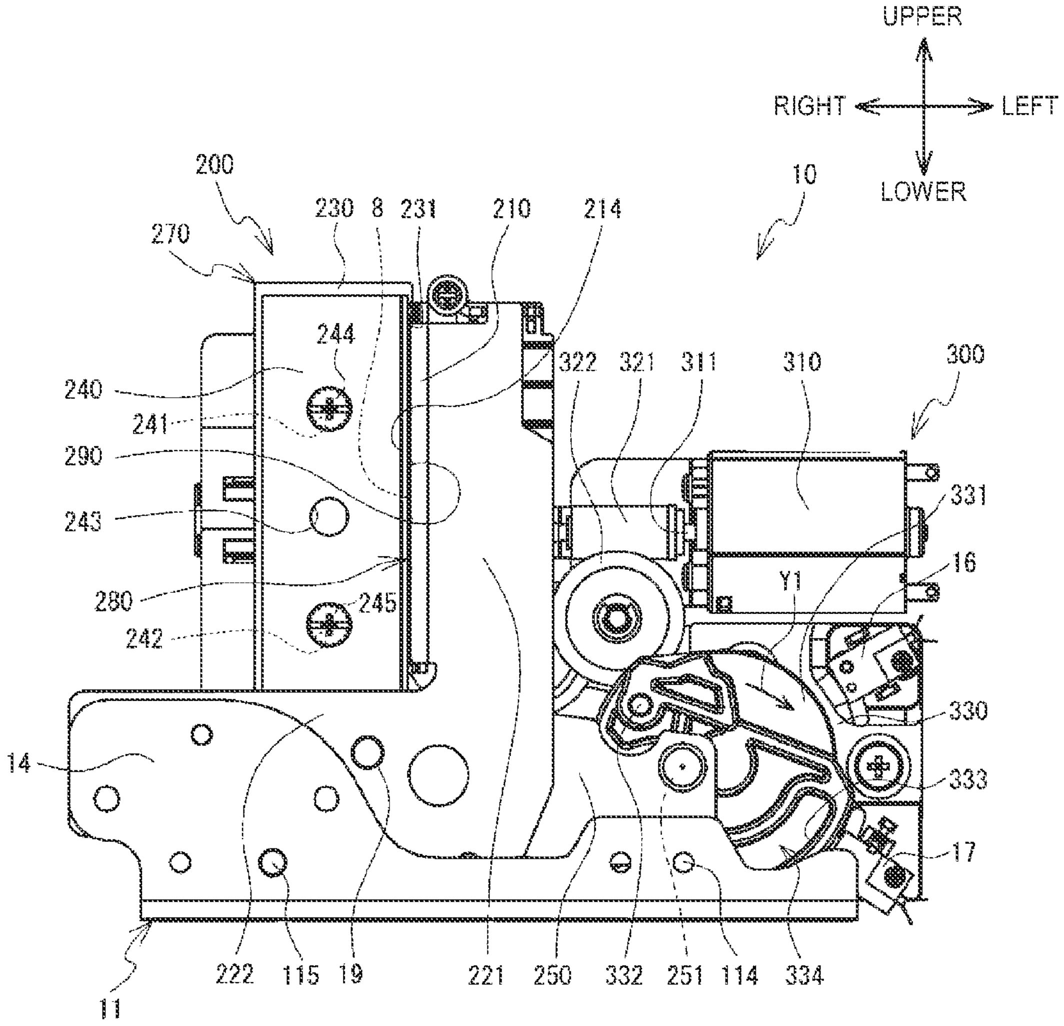
FIG. 7 is a rear view of the cutting device 10 (excluding the full-cut mechanism 100) when the cutting blade 240 is located at a cutting position.
Figure 8:
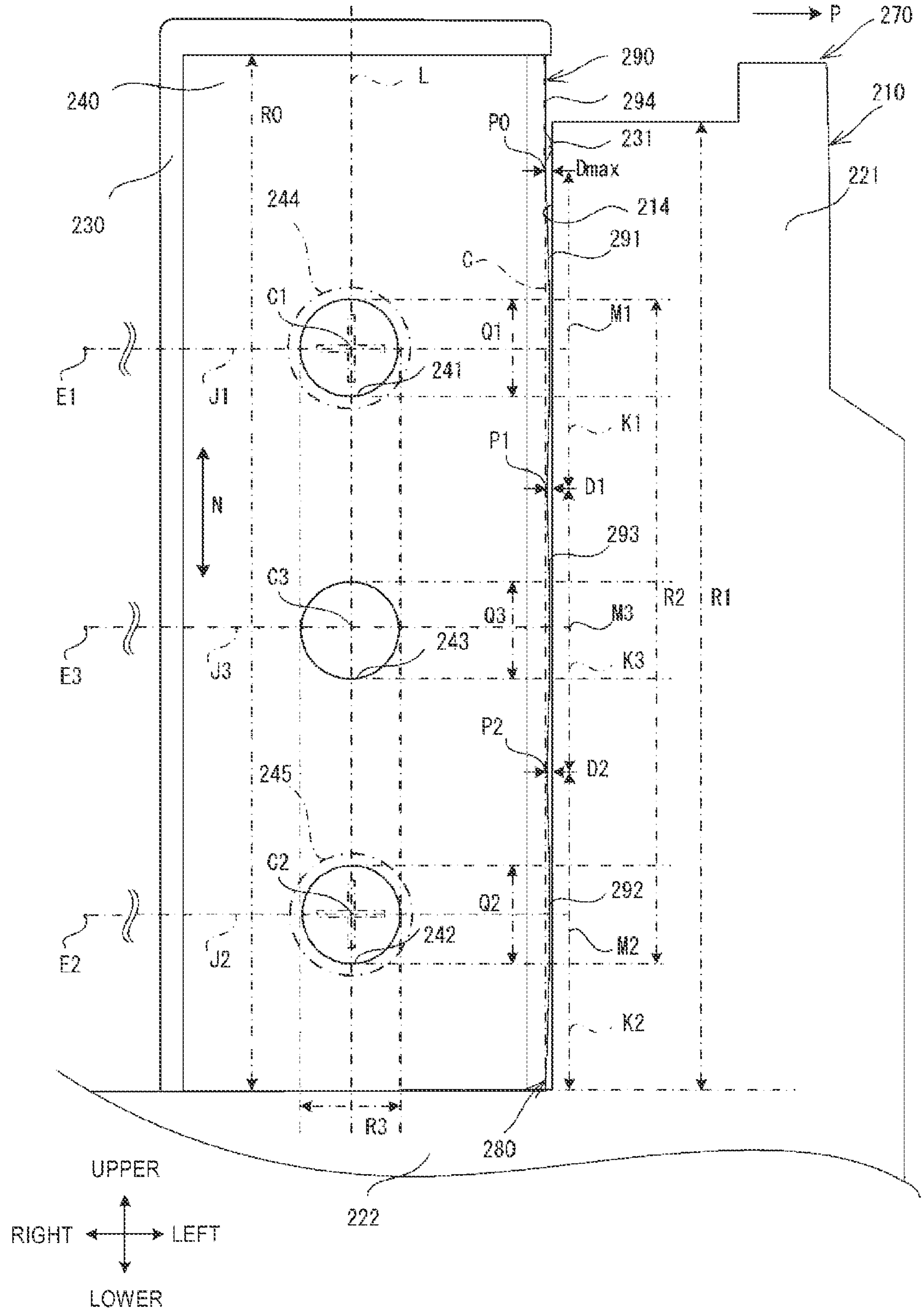
FIG. 8 is an enlarged pictorial rear view of the cutting blade 240 and a support base 210 when the cutting blade 240 is located at the cutting position.

The half-cut mechanism 200 is described in detail with reference to FIGS. 3, 4 and 6 to 9. As shown in FIGS. 3 and 4, the half-cut mechanism 200 includes a support base 210, a cutting part 270, a second arm 250, and a second pin 251. The support base 210 is provided on a front side of the cutting blade 130 with the spacer 260 being interposed therebetween. The support base 210 is a rectangular plate, in a side view. As shown in FIGS. 6 to 8, the support base 210 has an extension part 221, a fixed part 222, and a support surface 214. The extension part 221 extends leftward from a rear end of the support base 210. The fixed part 222 extends rightward from a lower end of the extension part 221. The fixed part 222 is fixed to a front face of the rear frame 14. The support surface 214 is a right surface of the support base 210. The support surface 214 faces the printed tape 8 conveyed by the pressing roller 36 and the feeding roller 93.

As shown in FIGS. 6 to 9, the culling part 270 faces the support base 210 from the right side with the tape 8 being interposed therebetween, in a rear view. The cutting part 270 has a cutting blade 240, a holding member 230, and a protrusion 231. The cutting blade 240 is a rectangular plate extending in the upper and lower direction, in a rear view. The cutting blade 240 has a first hole 241, a second hole 242, a third hole 243, and a blade edge 290. The first hole 241, the second hole 242, and the third hole 243 are arranged side by side in the longitudinal direction N of the cutting blade 240. In the present example, each of the first hole 241, the second hole 242, and the third hole 243 are a circular hole penetrating in the front and rear direction, in a front view. The cutting blade 240 is fixed to a backside of the holding member 230 by a first hole coupling member 244 inserted in the first hole 241 and a second hole coupling member 245 inserted in the second hole 242. The first hole coupling member 244 and the second hole coupling member 245 are each a screw, for example.

The third hole 243 is arranged between the first hole 241 and the second hole 242 in the longitudinal direction N of the cutting blade 240, The first hole 241, the second hole 242, and the third hole 243 are each aligned at substantially equal intervals in the longitudinal direction N of the cutting blade 240. As shown in FIG. 8, a part of the first hole 241, a part of the second hole 242, and a part of the third hole 243 are arranged on a same straight line extending in the longitudinal direction N of the cutting blade 240. The same straight line is, for example, a straight line L. The straight line L extends in the longitudinal direction N of the cutting blade 240, and passes through a center C1 of the first hole 241, a center C2 of the second hole 242, and a center C3 of the third hole 243.

In a width direction of the cutting blade 240, an extension range of the first hole 241, an extension range of the second hole 242 and an extension range of the third hole 243 at least partially overlap each other. In the present embodiment, the extension ranges of the first hole 241, the second hole 242, and the third hole 243 in the width direction of the cutting blade 240 are each a range R3 and are the same. The range R3 includes a center of the cutting blade 240 in the width direction.

Figure 9:
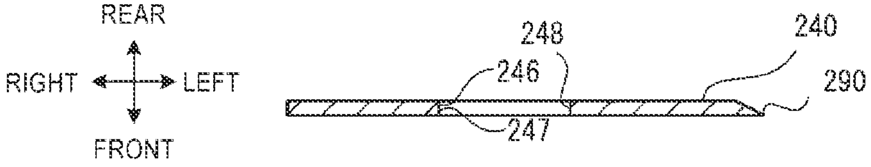
FIG. 9 is a sectional view of the cutting blade 240.

The first hole 241, the second hole 242, and the third hole 243 are each formed by press working. In a case of collectively referring to the first hole 241, the second hole 242, and the third hole 243 and in a case of indicating the same without distinction, they are referred to as the hole 248. As shown in FIG. 9, the hole 248 has a shear surface 246 and a fracture surface 247. The shear surface 246 is a smooth surface that is glossy and has lines extending in the thickness direction of the cutting blade 240. The fracture surface 247 is a surface that is rougher than the shear surface 246.

The blade edge 290 is provided at a left end of the cutting blade 240. Therefore, the blade edge 290 is directed leftward. The blade edge 290 protrudes further leftward than a left end of the holding member 230. As shown in FIG. 8, the blade edge 290 has a first convex portion 291, a second convex portion 292, a third convex portion 293, and a straight line portion 294. The first convex portion 291 is provided at a position corresponding to the first hole 241, and is convex in a convex direction P which is a direction from the first hole 241 toward the blade edge 290. The convex direction P is a direction parallel to the width direction of the cutting blade 240. The second convex portion 292 is provided at a position corresponding to the second hole 242, and is convex in the convex direction P. The third convex portion 293 is provided at a position corresponding to the third hole 243, and is convex in the convex direction P.

The straight line portion 294 is a portion arranged more distant from the second shaft 19 than the first convex portion 291 in the longitudinal direction N of the cutting blade 240 and extending in a straight line shape in the longitudinal direction N of the cutting blade 240. In the longitudinal direction N of the cutting blade 240, a lower end of the straight line portion 294 connects to an upper end of the first convex portion 291 at a point P0, a lower end of the first convex portion 291 connects to an upper end of the third convex portion 293 at a point P1, and a lower end of the third convex portion 293 connects to an upper end of the second convex portion 292 at a point P2. In FIG. 8, a position of the straight line portion 294 in the convex direction P is shown with a virtual line C. End portions of the first convex portion 291, the second convex portion 292, and the third convex portion 293 in the convex direction P are each positioned further to the convex direction P-side than an end portion of the straight line portion 294 in the convex direction P. Amounts of maximum protrusion of the first convex portion 291, the second convex portion 292, and the third convex portion 293 in the convex direction P on the basis of the virtual line C are each several μms to several tens of μms, and are substantially the same. The amounts of protrusion of the first convex portion 291, the second convex portion 292, and the third convex portion 293 in the convex direction P can be measured according to a straightness measuring method using a well-known device such as a measuring microscope, a CNC (Computer Numerical Control) image measuring device and a three-dimensional measuring device, for example.

In a state where the cutting blade 240 is arranged at the cutting position, an extension range R0 of the cutting blade 240 in the longitudinal direction N of the cutting blade 240 is larger than an extension range R1 of the support base 210 in the longitudinal direction N of the cutting blade 240. In the state where the cutting blade 240 is arranged at the cutting position, extension ranges K1 to K3 of the first convex portion 291, the second convex portion 292 and the third convex portion 293 in the longitudinal direction N of the cutting blade 240 are each within the range R1 in which the blade edge 290 faces the support base 210 in the longitudinal direction N of the cutting blade 240. A center M1 of the first convex portion 291 in the longitudinal direction N of the cutting blade 240 is within an extension range Q1 of the first hole 241 in the longitudinal direction N of the cutting blade 240. A center M2 of the second convex portion 292 in the longitudinal direction N of the cutting blade 240 is within an extension range Q2 of the second hole 242 in the longitudinal direction N of the cutting blade 240. A center M3 of the third convex portion 293 in the longitudinal direction N of the cutting blade 240 is within an extension range Q3 of the third hole 243 in the longitudinal direction N of the cutting blade 240.

On a virtual plane orthogonal to the thickness direction of the cutting blade 240 and in the width direction of the cutting blade 240, the first convex portion 291 the second convex portion 292, and the third convex portion 293 each have the following shape. The first convex portion 291 has an arc shape whose center is a point E1 arranged on a line segment J1 passing through the first convex portion 291 and the first hole 241 and arranged in an opposite region to the first convex portion 291 with respect to the first hole 241. The second convex portion 292 has an arc shape whose center is a point E2 arranged on a line segment J2 passing through the second convex portion 292 and the second hole 242 and arranged in an opposite region to the second convex portion 292 with respect to the second hole 242. The third convex portion 293 has an arc shape whose center is a point E3 arranged on a line segment J3 passing through the third convex portion 293 and the third hole 243 and arranged in an opposite region to the third convex portion 293 with respect to the third hole 243.

In a case where the cutting blade 240 is arranged at the cutting position, maximum values D1 and D2 of a distance between the blade edge 290 and the support base 210 within a range R2 between the first hole 241 and the second hole 242 in the longitudinal direction N of the cutting blade 240 is smaller than a maximum value Dmax of a distance between the blade edge 290 and the support base 210. The maximum value Dmax is a distance between the straight line portion 294 and the support base 210 in the case where the cutting blade 240 is arranged at the cutting position. The maximum value Dmax is smaller than a thickness of the release paper 822. The maximum value D1 is a distance between the point P1 at which the lower end of the first convex portion 291 and the upper end of the third convex portion 293 connect to each other and the support base 210. The maximum value D2 is a distance between the point P2 at which the lower end of the third convex portion 293 and the upper end of the second convex portion 292 connect to each other and the support base 210. That is, the arc formed by the end portion of the first convex portion 291 in the convex direction P and the arc formed by the end portion of the third convex portion 293 in the convex direction P intersect with each other on a further side than the virtual line C in the convex direction P. The arc formed by the end portion of the third convex portion 293 in the convex direction P and the arc formed by the end portion of the second convex portion 292 in the convex direction P intersect with each other on a further side than the virtual line C in the convex direction P.

The holding member 230 is a rectangular plate, in a rear view, and is provided on a front side of the fixed part 222. The holding member 230 is configured to hold the cutting blade 240 so as to be movable to the cutting position and the spaced position. As shown in FIGS. 7 and 8, the cutting position is a position at which the cutting blade 240 is close to the support base 210. As shown in FIG. 6, the spaced position is a position at which the cutting blade 240 is spaced from the support base 210.

The protrusion 231 protrudes from an upper end portion of a left end of the holding member 230 toward the support base 210 in the direction (left) in which the blade edge 290 is directed. An amount of protrusion of the protrusion 231 from the left end of the holding member 230 is larger than an amount of protrusion of the blade edge 290 from the left end of the holding member 230. Therefore, a tip end of the protrusion 231 is positioned further to the left side than the blade edge 290. When the cutting blade 240 is located at the cutting position, the protrusion 231 is in contact with the support base 210, and the blade edge 290 is spaced from the support base 210, so that a gap 280 is formed between the blade edge 290 and the support base 210.

As shown in FIG. 4, the second arm 250 connects to the cutting part 270. The second arm 250 is provided on a front side of the first arm 140, and extends leftward from a lower end portion of the holding member 230. In the present embodiment, the second arm 250 is integrally formed with the holding member 230. The second pin 251 is provided at a left end portion of the second arm 250. The second pin 251 protrudes forward from a front face of the second arm 250 and is fitted in a second groove 333, which will be described later.

The second shaft 19 is configured to support the second arm 250. The second shaft 19 is provided on an upper right side of the first shaft 18, and is positioned further to the right side than the second pin 251. The second shaft 19 extends rearward from a right lower part of the front frame 13, penetrates a right end portion of the second arm 250, and extends to the fixed part 222. Therefore, the second arm 250 can rotate around the second shaft 19. The cutting part 270 is configured to rotate around the second shaft 19 toward or away from the support base 210 according to rotation of the second arm 250. The cutting blade 240 can move between the spaced position (refer to FIG. 6) and the cutting position (refer to FIGS. 7 and 8) as the cutting part 270 rotates around the second shaft 19. As shown in FIG. 6, when the cutting blade 240 is located at the spaced position, the protrusion 231 is spaced rightward from the support surface 214. As shown in FIGS. 7 and 8, when the cutting blade 240 is located at the cutting position, the protrusion 231 is brought into contact with the support surface 214.

In the half-cut operation by the half-cut mechanism 200, the cutting blade 240 is moved from the spaced position to the cutting position in conjunction with rotation of the second arm 250, in a state where the tape 8 is arranged between the support surface 214 and the cutting blade 240. The protrusion 231 is abutted against the support surface 214, and the blade edge 290 of the cutting blade 240 bites from the printing tape 81-side of the tape 8 arranged between the cutting blade 240 and the support surface 214 to a part of the release paper 822 in the thickness direction. By the half-cut operation, the printing tape 81 and the both-sided adhesive tape 821 of the bonding tape 82 are entirely cut in the thickness direction, but only a part of the release paper 822 in the thickness direction is cut, and a part of the release paper 822 arranged in the gap 280 is not cut. That is, the release paper 822 is partially cut in the thickness direction.

The drive mechanism 300 is described in detail with reference to FIGS. 3 and 4. As shown in FIGS. 3 and 4, the drive mechanism 300 includes a cutting motor 310, a plurality of gears 321 to 324, and a cam 330. The cutting motor 310 is fixed to a left upper part of the front frame 13, and is provided at a position overlapping the third shaft 340 (which will be described later) in the upper and lower direction. The cutting motor 310 is provided with a rotary shaft 311. The rotary shaft 311 protrudes rightward from a right surface of the cutting motor 310.

The gear 321 is fixed to the rotary shaft 311. The gear 322 is provided on a lower side of the gear 321, and is in mesh with a lower end of the gear 321. The gear 323 is provided on a lower side of the gear 322, and is in mesh with a lower end of the gear 322. The gear 324 is provided on a left side of the gear 323, and is in mesh with a left end of the gear 323.

The cam 330 is fixed to a backside of the gear 324. In the present embodiment, the cam 330 and the gear 324 are integrally format. The gear 324 is supported by the third shaft 340. The third shaft 340 extends rearward from a left part of the front frame 13, and is fitted to a center of the gear 324. Therefore, the cam 330 can rotate in a direction Y1 and in a direction Y2 around the third shaft 340, together with the gear 324. The direction Y1 and the direction Y2 are rotating directions opposite to each other. In the present embodiment, the direction Y1 is a clockwise direction, in a rear view, and the direction Y2 is a counterclockwise direction, in a rear view. The cam 330 rotates around the third shaft 340 in the direction Y1 or the direction Y2, thereby selectively transmitting a drive force from the cutting motor 310 to the first arm 140 and the second arm 250.

A cam surface 331A is formed on a backside of the cam 330. The cam surface 331 is a reference surface on which an unevenness for transmitting force is provided, and extends orthogonal to the third shaft 340. For example, in a case where the backside of the cam 330 is provided with a step, the cam surface 331 indicates any one reference plane of a plurality of planes forming the backside of the cam 330.

The cam surface 331 is provided with a first pin 332 and a second groove 333. The first pin 332 protrudes rearward from the cam surface 331, and is fitted in the first groove 141. The second groove 333 is recessed forward from the cam surface 331, and is configured by an arc groove 334 and a pressing groove 335. The arc groove 334 has an arc shape whose center is the third shaft 340, in a rear view, and which is convex rightward. The pressing groove 335 further extends (downward in FIG. 4) from an upper end of the arc groove 334 toward the third shaft 340, in a rear view. In the second groove 333, the second pin 251 is fitted.

When causing the full-cut mechanism 100 to perform the full-cut operation, the controller of the printer 1 drives the cutting motor 310 to rotate the cam 330 in the direction Y1, in a state (hereinbelow, referred to as a standby state) where the cutting blade 130 is located at the standby position and the cutting blade 240 is located at the spaced position, as shown in FIGS. 3 and 6. When the cam 330 rotates in the direction Y1, the first pin 332 moves in the pressing groove 143 to press down a part of the first arm 140 at the left of the first shaft 18 around the first shaft 18. Thereby, the first arm 140 rotates around the first shaft 18 in a clockwise direction, in a rear view. As the first arm 140 rotates, the cutting blade 130 is moved from the standby position (refer to FIG. 3) toward the full-cut position (refer to FIG. 5). At this time, the second pin 251 moves along the arc groove 334 without pressing the second arm 250 (refer to FIG. 5). Therefore, the cutting blade 240 is kept at the standby position. After the cutting blade 130 is moved to the full-cut position, the controller drives the cutting motor 310 to rotate the cam 330 in the direction Y2, thereby returning to the standby state.

When causing the half-cut mechanism 200 to perform the half-cut operation, the controller of the primer 1 drives the culling motor 310 to rotate the cam 330 in the direction Y2, in the standby state, as shown in FIGS. 3 and 6. When the cam 330 rotates in the direction Y2, the second pin 251 moves in the pressing groove 335, so that an upper wall of the pressing groove 335 presses down the second pin 251 around the second shaft 19. Thereby, the second arm 250 rotates around the second shaft 19 in the clockwise direction, in a rear view. As the second arm 250 rotates, the cutting blade 240 is moved from the spaced position (refer to FIG.

6) toward the cutting position (refer to FIG. 7). At this time, since the first pin 332 moves along the arc groove 142, the first pin 332 does not press the first arm 140 and the cutting blade 130 is kept at the standby position. After the cutting blade 240 is moved to the cutting position (refer to FIG. 7), the controller continues the state where the protrusion 231 presses the support surface 214, for a predetermined time period. The controller drives the culling motor 310 to the cam 330 in the direction Y1, thereby returning to the standby state.

In the printer 1 of the above-described embodiment, the printer 1, the cutting device 10, the support base 210, the holding member 230, and the cutting blade 240 are examples of the printer, the cutting device, the support base, the holding member, and the cutting blade of the present disclosure, respectively. The first hole 241, the second hole 242, the third hole 243, the first hole coupling member 244, the second hole coupling member 245, the shear surface 246, and the fracture surface 247 are examples of the first hole, the second hole, the third hole, the first hole coupling member, the second hole coupling member, the shear surface, and the fracture surface of the present disclosure, respectively. The blade edge 290, the first convex portion 291, the second convex portion 292, and the third convex portion 293 are examples of the blade edge, the first convex portion, the second convex portion, and the third convex portion of the present disclosure, respectively. The thermal head 32 is an example of the printing unit of the present disclosure. The platen roller 35 and the pressing roller 36 are examples of the conveying unit of the present disclosure.

The printer 1 of the above-described embodiment includes the support base 210, the cutting blade 240, and the holding member 230. The cutting blade 240 is configured to cut at least a part of the tape 8 arranged between the cutting blade 240 and the support base 210 in a case where the cutting blade 240 is arranged at the cutting position close to the support base 210. The cutting blade 240 has the first hole 241, the second hole 242, and the blade edge 290. The first hole 241 penetrates in the thickness direction of the cutting blade 240. The second hole 242 is arranged side by side with the first hole 241 in the longitudinal direction N of the cutting blade 240. The blade edge 290 extends in the longitudinal direction N of the cutting blade 240, and has the first convex portion 291 and the second convex portion 292. The first convex portion 291 is provided at the position corresponding to the first hole 241 in the longitudinal direction N of the cutting blade 240 and is convex in the convex direction P which is a direction from the first hole 241 toward the blade edge 290. The second convex portion 292 is provided at the position corresponding to the second hole 242 in the longitudinal direction N of the cutting blade 240 and is convex in the convex direction P. In the case where the cutting blade 240 is arranged at the cutting position, the maximum values D1 and D2 of the distance between the blade edge 290 and the support base 210 within the range R2 between the first hole 241 and the second hole 242 in the longitudinal direction N of the cutting blade 240 is smaller than the maximum value Dmax between the blade edge 290 and the support base 210. The cutting blade 240 is fixed to the holding member 230 by the first hole coupling member 244 inserted in the first hole 241. The holding member 230 holds the cutting blade 240 so as to be movable to the cutting position and the spaced position at which the cutting blade 240 is distant from the support base 210.

In the half-cut mechanism 200 of the printer 1 of the above-described embodiment, the first hole 241 and the second hole 242 are arranged side by side in the longitudinal direction N of the cutting blade 240 so that, in the case where the cutting blade 240 is arranged at the cutting position, the maximum values D1 and D2 between the blade edge 290 and the support base 210 within the range R2 between the first hole 241 and the second hole 242 in the longitudinal direction N of the cutting blade 240 is smaller than the maximum value Dmax between the blade edge 290 and the support base 210. For this reason, according to the cutting device 10, in the case where the cutting blade 240 is arranged at the cutting position, by making the variation in distance between the blade edge 290 and the support base 210 to be smaller than that in the related art within the range R2 between the first hole 241 and the second hole 242 in the longitudinal direction N of the cutting blade 240, it is possible to reduce the variation in distance between the blade edge 290 and the support base 210 in the case where the cutting blade 240 is arranged at the cutting position as compared to the related art without increasing a size of the cutting blade 240 as compared to the related art.

The cutting blade 240 of the half-cut mechanism 200 has the third hole 243 arranged side by side with the first hole 241 and the second hole 242 in the longitudinal direction N of the cutting blade 240. The blade edge 290 has the third convex portion 293 provided at the position corresponding to the third hole 243 in the longitudinal direction N of the cutting blade 240 and being convex in the convex direction P. The third hole 243 is arranged between the first hole 242 and the second hole 242 in the longitudinal direction N of the cutting blade 240. In the case where the cutting blade 240 is arranged at the cutting position, the maximum values D1 and D2 of the distance between the blade edge 290 and the support base 210 within the range R2 between the first hole 241 and the second hole 242 in the longitudinal direction N of the cutting blade 240 is smaller than the maximum value Dmax of the distance between the blade edge 290 and the support base 210. The range R2 is within the range R1 and includes the center of the cutting blade 240 in the longitudinal direction N. In the half-cut mechanism 200 of the printer 1, the first hole 241, the second hole 242 and the third hole 243 are arranged side by side in the longitudinal direction N of the cutting blade 240 so that, in the case where the cutting blade 240 is arranged at the cutting position, the maximum values D1 and D2 between the blade edge 290 and the support base 210 within the range R2 between the first hole 241 and the second hole 242 in the longitudinal direction N of the cutting blade 240 is smaller than the maximum value Dmax between the blade edge 290 and the support base 210. Even in a case where the cutting blade 240 is relatively long in the longitudinal direction N, in the case where the cutting blade 240 is arranged at the culling position, the half-cut mechanism 200 can reduce the variation in distance between the blade edge 290 and the support base 210 within the range R2 between the first hole 241 and the second hole 242 in the longitudinal direction N of the culling blade 240 as compared to the related art. Therefore, the half-cut mechanism 200 can reduce the variation in distance between the cutting blade 240 and the support base 210 when the cutting blade 240 is arranged at the cutting position as compared to the related art, without increasing a size of the cutting blade 240 as compared to the related art.

The second hole 242 of the half-cut mechanism 200 penetrates in the thickness direction of the cutting blade 240, The cutting blade 240 is fixed to the holding member 230 by the first hole coupling member 244 inserted in the first hole 241 and the second hole coupling member 245 inserted in the second hole 242. The third hole 243 is not used for fixing the cutting blade 240 to the holding member 230, and is exposed with respect to the holding member 230. Therefore, the cutting blade 240 of the half-cut mechanism 200 can use the second hole 242 for holding the cutting blade 240 on the holding member 230. The half-cut mechanism 200 fixes the cutting blade 240 to the holding member 230 at two places by the first hole coupling member 244 inserted in the first hole 241 and the second hole coupling member 245 inserted in the second hole 242. Therefore, as compared to a case where the cutting blade 240 is fixed to the holding member 230 only by the first hole coupling member 244 inserted in the first hole 241, the cutting blade 240 does not rotate with respect to the holding member 230, so that the tape 8 can be stably cut. In the cutting device 10, the third hole 243 is not used for holding the cutting blade 240 on the holding member 230. Therefore, as compared to a case where the third hole 243 is used for holding the cutting blade 240 on the holding member 230, the degree of freedom when setting an arrangement, a shape, a size and the like of the third hole 243 with respect to the first hole 241 and the second hole 242 is larger.

The third hole 243 of the half-cut mechanism 200 is arranged between the first hole 241 and the second hole 242 in the longitudinal direction N of the cutting blade 240. In the half-cut mechanism 200, by providing the third hole 243 between the first hole 241 and the second hole 242, it is possible to increase the degree of design freedom of the second hole 242 with respect to the first hole 241.

Each of the first hole 241, the second hole 242 and the third hole 243 of the half-cut mechanism 200 has the shear surface 246 and the fracture surface 247. In the half-cut mechanism 200, the first hole 241, the second hole 242, and the third hole 243 can be relatively easily formed by the press working.

On the virtual plane orthogonal to the thickness direction of the cutting blade 240 and in the width direction of the cutting blade 240, the first convex portion 291 has an arc shape whose center is the point E1 arranged on the line segment J1 passing through the first convex portion 291 and the first hole 241 and arranged in the opposite region to the first convex portion 291 with respect to the first hole 241. The second convex portion 292 has an arc shape whose center is the point E2 arranged on the line segment J2 passing through the second convex portion 292 and the second hole 242 and arranged in the opposite region to the second convex portion 292 with respect to the second hole 242. The third convex portion 293 has an arc shape whose center is the point E3 arranged on the line segment J3 passing through the third convex portion 293 and the third hole 243 and arranged in the opposite region to the third convex portion 293 with respect to the third hole 243. The center M1 of the first convex portion 291 in the longitudinal direction N of the cutting blade 240 is within the extension range Q1 of the first hole 241 in the longitudinal direction N of the cutting blade 240. The center M2 of the second convex portion 292 in the longitudinal direction N of the cutting blade 240 is within the extension range Q2 of the second hole 242 in the longitudinal direction N of the cutting blade 240. The center M3 of the third convex portion 293 in the longitudinal direction N of the cutting blade 240 is within the extension range Q3 of the third hole 243 in the longitudinal direction N of the cutting blade 240. Even in a case where the blade edge 290 of the cutting blade 240 is formed with the first convex portion 291, the second convex portion 292 and the third convex portion 293 due to material flow during formation of the first hole 241, the second hole 242 and the third hole 243, the half-cut mechanism 200 can reduce the variation in distance between the cutting blade 240 and the support base 210 in the case where the cutting blade 240 is arranged at the cutting position as compared to the related art.

In the state where the cutting blade 240 is arranged at the cutting position, the extension range K1 of the first convex portion 291, the extension range K2 of the second convex portion 292, and the extension range K3 of the third convex portion 293 in the longitudinal direction N of the cutting blade 240 are within the range R1 in which the blade edge 290 faces the support base 210 in the longitudinal direction N of the cutting blade 240. The half-cut mechanism 200 usually cuts the tape 8 arranged in the range in which the blade edge 290 faces the support base 210 in the longitudinal direction of the cutting blade 240. The half-cut mechanism 200 can further reduce the variation in distance between the cutting blade 240 and the support base 210 in the case where the cutting blade 240 is arranged at the cutting position as compared to the related art, in the range that is used for cutting of the tape 8.

A part of the first hole 241, a part of the second hole 242, and a part of the third hole 243 of the half-cut mechanism 200 are arranged on the same straight line L extending in the longitudinal direction N of the cutting blade 240. In the half-cut mechanism 200, the arrangement of the first hole 241, the second hole 242 and the third hole 243 in the direction orthogonal to the thickness direction and orthogonal to the longitudinal direction N of the cutting blade 230 can be kept within a predetermined range.

The half-cut mechanism 200 is a half cutter in which the blade edge 290 of the cutting blade 240 and the support base 210 are spaced in a state where the cutting blade 240 is arranged at the cutting position, and the half cutter is configured to cut the tape 8 arranged between the cutting blade 240 and the support base 210 partially in the thickness direction of the tape 8 in the case where the cutting blade 240 is arranged at the cutting position. The half-cut mechanism 200 can cut the tape 8 partially in the thickness direction.

The present disclosure can be diversely changed from the above-described embodiment. For example, the configuration of the cutting device 10 of the above-described embodiment may be changed to Modified Embodiment 1 shown in FIG. 10 and Modified Embodiment 2 shown in FIG. 11. A cutting device of the Modified Embodiment 1 is different from the half-cut mechanism 200 of the above-described embodiment, in that a half-cut mechanism includes a support base 410 and a cutting part 470, instead of the support base 210 and the cutting part 270. The cutting part 470 of the Modified Embodiment 1 includes a cutting blade 440, a holding member 430, and a protrusion 431. The cutting blade 440 has a rectangular plate shape extending in the upper and lower direction, in a rear view.

The cutting blade 440 has a first hole 441, a second hole 442, and a blade edge 490. The first hole 441 and the second hole 442 are arranged side by side in the longitudinal direction N of the cutting blade 440. The first hole 441 and the second hole 442 are each a hole penetrating in the front and rear direction and having a circular shape, in a front view. The cutting blade 440 is fixed to a backside of the holding member 430 by a first hole coupling member 443 (for example, a screw) inserted in the first hole 441.

Figure 10:
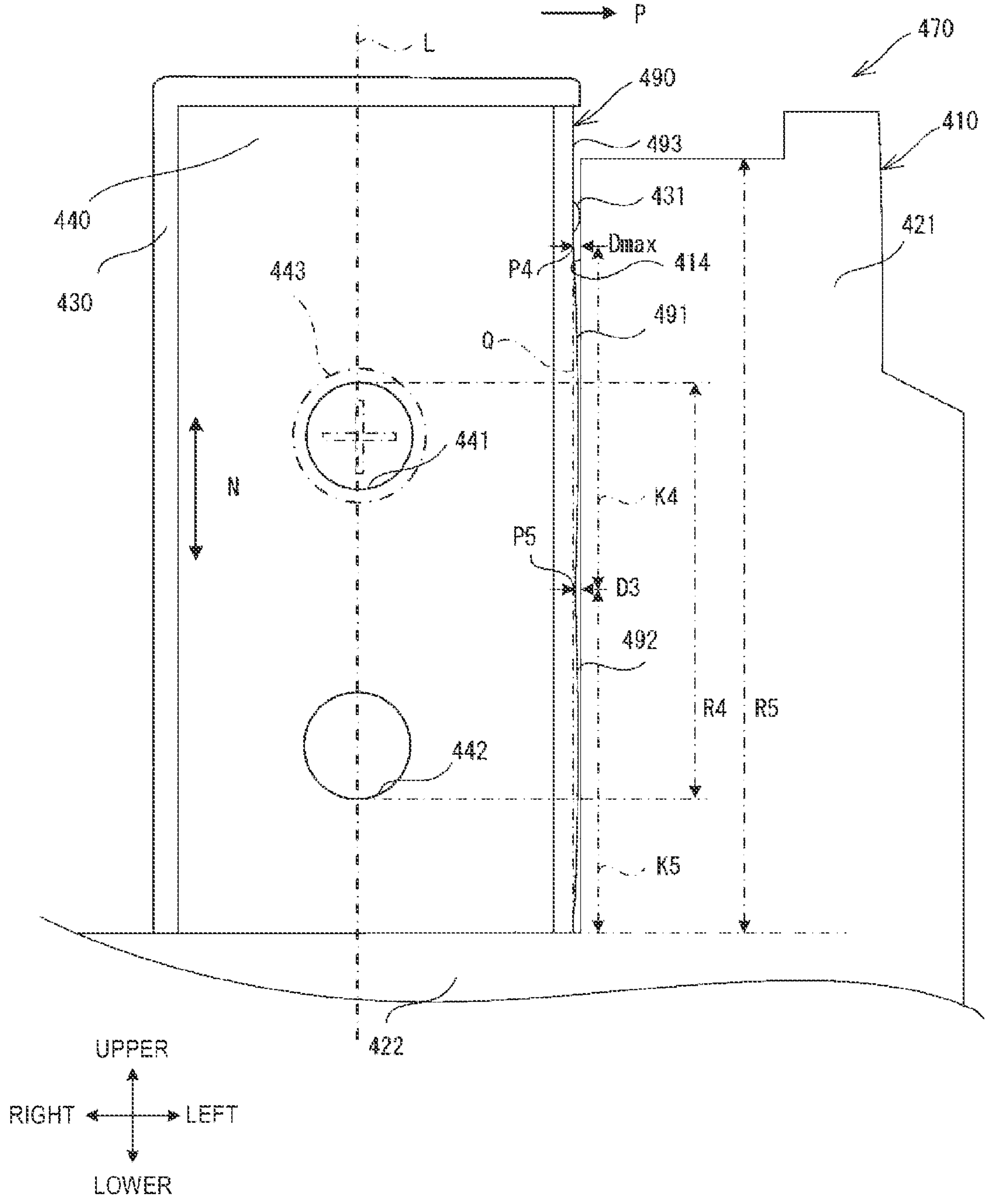
FIG. 10 is an enlarged pictorial rear view of a cutting blade 440 and a support base 410 when the cutting blade 440 of a half-cut mechanism of a cutting device in accordance with Modified Embodiment 1 is located at the cutting position.

The blade edge 490 has a first convex portion 491, a second convex portion 492, and a straight line portion 493. The first convex portion 491 is provided at a position corresponding; to the first hole 441 in the longitudinal direction N of the cutting blade 440 and is convex in the convex direction P which is a direction from the first hole 441 toward the blade edge 490. The second convex portion 492 is provided at a position corresponding to the second hole 442 and is convex in the convex direction P. A lower end of the straight line portion 493 in the longitudinal direction N of the cutting blade 440 connects to an upper end of the first convex portion 491 at a point P4, and a lower end of the first convex portion 491 connects to an upper end of the second convex portion 492 at a point P5. In FIG. 10, a position of the straight line portion 493 in the convex direction P is denoted by a virtual line Q. When the cutting blade 440 is arranged at the cutting position, a maximum value D3 of a distance between the blade edge 490 and the support base 410 in a range R4 between the first hole 441 and the second hole 442 in the longitudinal direction N of the cutting blade 440 is smaller than a maximum value Dmax of the distance between the blade edge 490 and the support, base 410. The range R4 includes a center of the cutting blade 440 in the longitudinal direction N. In a state where the cutting blade 440 is arranged at the cutting position, an extension range K4 of the first convex portion 491 and an extension range K5 of the second convex portion 492 in the longitudinal direction N of the cutting blade 440 are each within a range R5 in which the blade edge 490 faces the support base 410 in the longitudinal direction N of the cutting blade 440.

The cutting blade 440 is fixed to the holding member 430 the first hole coupling member 443 inserted in the first hole 441, and the holding member 430 is configured to hold the cutting blade 440 so as to be movable to the cutting position and the spaced position at which the cutting blade 440 is distant from the support base 410. The protrusion 431 protrudes from an upper end portion of a left end of the holding member 430 toward the support base 410 in a direction (leftward) in which the blade edge 490 is directed. An amount of protrusion of the protrusion 431 from the left end of the holding member 430 is larger than an amount of protrusion of the blade edge 490 from the left end of the holding member 430.

According to the cutting device of the Modified Embodiment 1, in the state where the cutting blade 440 is arranged at the cutting position, within the range R4 between the first hole 441 and the second hole 442 in the longitudinal direction N of the cutting blade 440, variation in distance between the blade edge 490 and the support base 410 is made smaller than that in the related art, so that it is possible to reduce the variation in distance between the blade edge 490 and the support base 410 when the cutting blade 440 is arranged at the cutting position as compared to the related art, without increasing a size of the cutting blade 440 as compared to the related art. According to the cutting device of the Modified Embodiment 1, the second hole 442 is not used for holding the cutting blade 440 on the holding member 430. Therefore, as compared to a case where the second hole 442 is used for holding the cutting blade 440 on the holding member 430, the degree of freedom when setting an arrangement, a shape, a size and the like of the second hole 442 with respect to the first hole 441 is larger.

Figure 11:
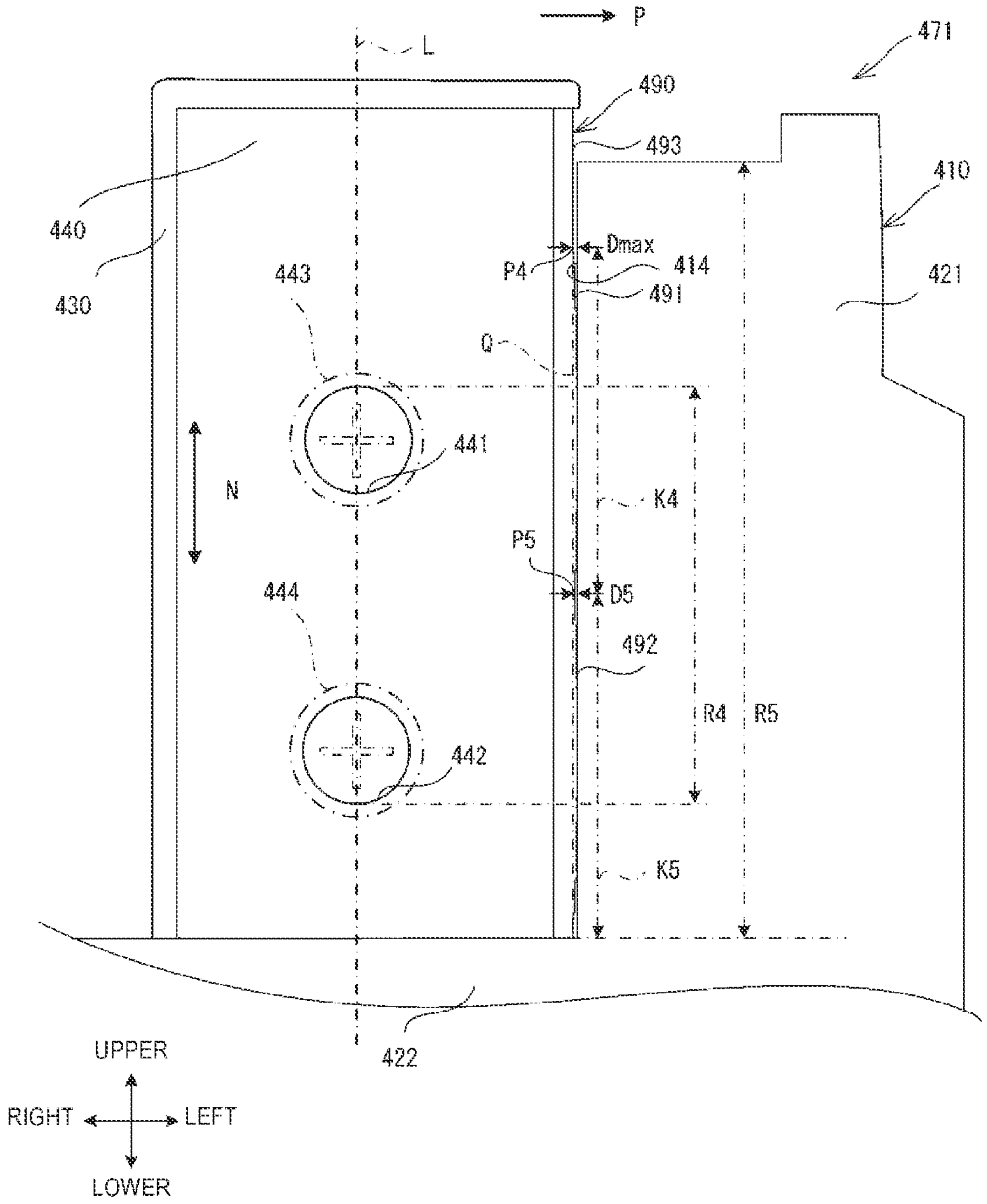
FIG. 11 is an enlarged pictorial rear view of the cutting blade 440 and the support base 410 when the culling blade 440 of a full-cut mechanism of a cutting device in accordance with Modified Embodiment 2 is located at the cutting position.

A cutting device of the Modified Embodiment 2 is different from the cutting device 10 of the above-described embodiment, in that the cutting device includes a full-cut mechanism having a similar configuration to the half-cut mechanism of the Modified Embodiment 1, instead of the full-cut mechanism 100. The full-cut mechanism of the Modified Embodiment 2 is different from the half-cut mechanism of the Modified Embodiment 1 shown in FIG. 10 in that the full-cut mechanism has a cutting part 471, instead of the cutting part 470, and the other configurations are the same as those of the half-cut mechanism of the Modified Embodiment 1. In FIG. 11, the configurations similar to the Modified Embodiment 1 of FIG. 10 are denoted with the same reference signs.

As shown in FIG. 11, the cutting part 471 of the Modified Embodiment 2 is different from the cutting part 470 of the Modified Embodiment 1 in that the cutting part 471 does not have the protrusion 431 and the cutting blade 440 is fixed to the holding member 430 by the first hole coupling member 443 inserted in the first hole 441 and a second hole coupling member 444 inserted in the second hole 442. A support surface 414 of the support base 410 is formed of a resilient material such as resin. The cutting part 471 is not provided with the protrusion 431. Therefore, when the cutting blade 440 is arranged at the cutting position, the cutting blade 440 is brought into contact with the support surface 414 and the support surface 414 is deformed due to pressing by the blade edge 490. When the support surface 414 is not deformed, in the state where the cutting blade 440 is arranged at the cutting position, a maximum value D5 of a distance between the blade edge 490 and the support base 410 within the range R4 between the first hole 441 and the second hole 442 in the longitudinal direction N of the cutting blade 440 is smaller than the maximum value Dmax of the distance between the blade edge 490 and the support base 410. In a case where the cutting blade 440 is arranged at the cutting position, and the blade edge 490 is pressed to the support surface 414 and the support surface 414 is thus deformed, the blade edge 490 is brought into contact with the support base 410 over the range RS due to deformation of the support surface 414. Thereby, the tape 8 is sandwiched and fully cut between the blade edge 490 of the cutting blade 440 and the support surface 414 in the longitudinal direction N of the cutting blade 440.

According to the cutting device of the Modified Embodiment 2, in a case where the cutting blade 440 has two holes, the second hole 442 can be used for holding the cutting blade 440 on the holding member 430. According to the cutting device of the Modified Embodiment 2, it is possible to fully cut the tape 8 in the thickness direction by the cutting blade 440.

The cutting device 10 may cut the tape 8 partially in the thickness direction, like the above-described embodiment and the Modified Embodiment 1, or may cut the tape 8 entirely in the thickness direction, like the Modified Embodiment 2. The cutting device 10 may have only one of the full-cut mechanism 100 and the half-cut mechanism 200. The drive mechanism 300 of the cutting device 10 may be changed as appropriate according to the configuration of the cutting device 10. The printer 1 may be a printing apparatus other than the label printer. The cutting device 10 may be provided to any apparatus, other than the printer 1.

In the cutting device 10, at least one of the plurality of holes 241 to 243 formed in the cutting blade 240 may penetrate in the thickness direction of the cutting blade 240, and the other holes may be holes which do not penetrate in the thickness direction, i.e., concave portions. The number, shapes, arrangement and sizes of the plurality of holes 241 to 243 formed in the cutting blade 240 may be changed as appropriate. For example, in the above-described embodiment, the extension ranges, in the width direction of the cutting blade 240, of the first hole 241, the second hole 242, and the third hole 243 formed in the cutting blade 240 may not overlap each other. The center M1 of the first convex portion 291 in the longitudinal direction N of the cutting blade 240 may be outside of the extension range Q1 of the first hole 241 in the longitudinal direction N of the cutting blade 240. The center M2 of the second convex portion 292 in the longitudinal direction N of the cutting blade 240 may be outside of the extension range Q2 of the second hole 242 in the longitudinal direction N of the cutting blade 240. The center M3 of the third convex portion 293 in the longitudinal direction N of the cutting blade 240 may be outside of the extension range Q3 of the third hole 243 in the longitudinal direction N of the cutting blade 240.

The extension range R1 of the support base 210 in the longitudinal direction N of the cutting blade 240 when arranged at the cutting position may be the same as the extension range R0 of the cutting blade 240 in the longitudinal direction N of the cutting blade 240 when arranged at the cutting position, or the extension range R1 of the support base 210 may be larger than the extension range R0 of the cutting blade 240. The shapes of the convex portion 291 to 293 provided to the blade edge 290 of the cutting blade 240 may be changed as appropriate. For example, the shape of the first convex portion 291 may not be the arc shape whose center is the point E1.

In the cutting device 10, at least one of the plurality of holes 241 to 243 formed in the cutting blade 240 may be used for fixing the cutting blade 240 on the holding member 230. The arrangement of the holes 241 and 242, which are used for fixing the cutting blade on the holding member 230, of the plurality of holes 241 to 243 formed in the cutting blade 240 may be changed as appropriate. For example, in the cutting blade 240 of the above-described embodiment, the first hole 241, the second hole 242, and the third hole 243 may all be used for fixing the cutting blade 240 to the holding member 230, or one or two selected from the first hole 241, the second hole 242 and the third hole 243 may be used for fixing the cutting blade 240 to the holding member 230. The first hole coupling member 244 and the second hole coupling member 245 may be any member capable of firmly fixing the cutting blade 240 to the holding member 230. For example, in addition to the screw connection member such as a screw and a combination of a bolt and a nut, a rivet, a convex portion to be fitted in the first hole (second hole), and the like may also be used.

What is claimed is:

1. A cutting device comprising:
a support base;
a cutting blade configured to cut at least a part of a tape arranged between the cutting blade and the support base in a state where the cutting blade is arranged at a cutting position close to the support base, the cutting blade having:
a first hole penetrating in a thickness direction of the cutting blade;
a second hole arranged side by side with the first hole in a longitudinal direction of the cutting blade; and
a blade edge extending in the longitudinal direction of the cutting blade, the blade edge having a first convex portion and a second convex portion, the first convex portion being provided at a position corresponding to the first hole in the longitudinal direction of the cutting blade and being convex in a first direction which is a direction from the first hole toward the blade edge, and the second convex portion being provided at a position corresponding to the second hole in the longitudinal direction of the cutting blade and being convex in the first direction, the first convex portion having a first arc shape including a first center and the second convex portion having a second arc shape including a second center spaced away from the first center, and
a holding member to which the cutting blade is fixed by a first hole coupling member inserted in the first hole, the holding member holding the cutting blade so as to be movable to the cutting position and a spaced position at which the cutting blade is distant from the support base,
wherein a first hole and the second hole are located within an intermediate range (R2) of the cutting blade in the longitudinal direction,
wherein the blade edge includes a first portion that is outside of the intermediate range and spaced away from the support base by a first maximum distance in the state where the cutting blade is arranged at the cutting position, and
wherein the blade edge includes a second portion that spans the intermediate range and is spaced away from the support base by a second maximum distance that is smaller than the first maximum distance in the state where the cutting blade is arranged at the cutting position.

2. The cutting device according to claim 1,
wherein the second hole penetrates in the thickness direction of the cutting blade, and
wherein the cutting blade is fixed to the holding member by the first hole coupling member inserted in the first hole and a second hole coupling member inserted in the second hole.

3. The cutting device according to claim 1,
wherein the second hole is not used for fixing the cutting blade to the holding member and is exposed with respect to the holding member.

4. The cutting device according to claim 1,
wherein each of the first hole and the second hole has a shear surface and a fracture surface.

5. The cutting device according to claim 1,
wherein a center of the first convex portion in the longitudinal direction of the cutting blade is within an extension range of the first hole in the longitudinal direction of the cutting blade, and
wherein a center of the second convex portion in the longitudinal direction of the cutting blade is within an extension range of the second hole in the longitudinal direction of the cutting blade.

6. The cutting device according to claim 1,
wherein in a state where the cutting blade is arranged at the cutting position, an extension range of the first convex portion and an extension range of the second convex portion in the longitudinal direction of the cutting blade are within a range in which the blade edge faces the support base in the longitudinal direction of the cutting blade.

7. The cutting device according to claim 1,
wherein the cutting blade further has a third hole arranged side by side with the first hole and the second hole in the longitudinal direction of the cutting blade,
wherein the blade edge further has a third convex portion provided at a position corresponding to the third hole in the longitudinal direction of the cutting blade and being convex in the first direction,
wherein the third hole is located within the intermediate range in the longitudinal direction of the cutting blade.

8. The cutting device according to claim 7,
wherein the second hole penetrates in the thickness direction of the cutting blade, wherein the cutting blade is fixed to the holding member by the first hole coupling member inserted in the first hole and a second hole coupling member inserted in the second hole, and wherein the third hole is not used for fixing the cutting blade to the holding member and is exposed with respect to the holding member.

9. The cutting device according to claim 8, wherein the third hole is arranged between the first hole and the second hole in the longitudinal direction of the cutting blade.

10. The cutting device according to claim 7, wherein each of the first hole, the second hole and the third hole has a shear surface and a fracture surface.

11. The cutting device according to claim 7, wherein a center of the first convex portion in the longitudinal direction of the cutting blade is within an extension range of the first hole in the longitudinal direction of the cutting blade, wherein a center of the second convex portion in the longitudinal direction of the cutting blade is within an extension range of the second hole in the longitudinal direction of the cutting blade, and wherein a center of the third convex portion in the longitudinal direction of the cutting blade is within an extension range of the third hole in the longitudinal direction of the cutting blade.

12. The cutting device according to claim 7, wherein in a state where the cutting blade is arranged at the cutting position, an extension range of the first convex portion, an extension range of the second convex portion, and an extension range of the third convex portion in the longitudinal direction of the cutting blade are within a range in which the blade edge faces the support base in the longitudinal direction of the cutting blade.

13. The cutting device according to claim 7, wherein a part of the first hole, a part of the second hole, and a part of the third hole are arranged on a same straight line extending in the longitudinal direction of the cutting blade.

14. The cutting device according to claim 1, wherein the cutting device is a half cutter in which the blade edge of the cutting blade and the support base are spaced apart in a state where the cutting blade is arranged at the cutting position, the half cutter being configured to cut the tape arranged between the cutting blade and the support base partially in a thickness direction of the tape in the state where the cutting blade is arranged at the cutting position.

15. The cutting device according to claim 1, wherein the cutting device is a full cutter in which the blade edge of the cutting blade is in contact with the support base in a state where the cutting blade is arranged at the cutting position, the full cutter being configured to cut the tape arranged between the cutting blade and the support base entirely in a thickness direction of the tape in the state where the cutting blade is arranged at the cutting position.

16. A printer comprising:

the cutting device according to claim 1;

a printing unit configured to perform printing on the tape; and a conveying unit configured to convey the tape printed by the printing unit, wherein the cutting blade and the support base are arranged to face each other with the tape conveyed by the conveying unit being interposed therebetween.

* * * * *